United States Patent
Ueda et al.

(10) Patent No.: US 7,920,353 B2
(45) Date of Patent: Apr. 5, 2011

(54) DISK DRIVE CONFIGURED TO CALCULATE HEAD REBOUND DISTANCE

(75) Inventors: Katsuki Ueda, Tachikawa (JP); Hideo Sado, Ome (JP); Takahisa Hagiwara, Tama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/704,033

(22) Filed: Feb. 11, 2010

(65) Prior Publication Data
US 2010/0321810 A1    Dec. 23, 2010

(30) Foreign Application Priority Data
Jun. 18, 2009    (JP) .................... 2009-145477

(51) Int. Cl.
*G11B 21/02*    (2006.01)
(52) U.S. Cl. .......................................... 360/75
(58) Field of Classification Search .............. None
See application file for complete search history.

(56) References Cited

U.S. PATENT DOCUMENTS

| | | | |
|---|---|---|---|
| 6,643,087 B1 * | 11/2003 | Kuroki et al. | 360/75 |
| 7,636,220 B1 * | 12/2009 | Chui et al. | 360/75 |
| 2002/0141102 A1 * | 10/2002 | Kusumoto | 360/75 |
| 2006/0203375 A1 * | 9/2006 | Fujii et al. | 360/75 |

FOREIGN PATENT DOCUMENTS

| | | |
|---|---|---|
| JP | 2004-234806 | 8/2004 |
| JP | 2005-116085 | 4/2005 |
| JP | 2005-149656 | 6/2005 |
| JP | 2005-174511 | 6/2005 |
| JP | 2006-323930 | 11/2006 |
| JP | 2007-102941 | 4/2007 |

* cited by examiner

*Primary Examiner* — Andrew L Sniezek
(74) *Attorney, Agent, or Firm* — Knobbe, Martens, Olson & Bear LLP

(57) ABSTRACT

According to one embodiment, a search module searches for a timing when a moving direction of a head changes in order to detect a first timing when the head collides against a stopper of a ramp during a head unload operation and a second timing when the head rebounds as a result of the collision. A calculation module calculates a rebound distance that the head has rebounded based on the first timing and the second timing.

20 Claims, 5 Drawing Sheets

DISK DRIVE CONFIGURED TO CALCULATE HEAD REBOUND DISTANCE

CROSS-REFERENCE TO RELATED APPLICATIONS

This application is based upon and claims the benefit of priority from Japanese Patent Application No. 2009-145477, filed Jun. 18, 2009, the entire contents of which are incorporated herein by reference.

BACKGROUND

1. Field

One embodiment of the invention relates to a disk drive configured to calculate a head rebound distance and which allows rebound of a head to be suitably adjusted when the head collides against a stopper of a ramp during a head unload operation.

2. Description of the Related Art

In general, if a power supply to a disk drive is interrupted, a head flying above a disk needs to be quickly unloaded onto a retract site called a ramp. For example, Jpn. Pat. Appln. KOKAI Publication No. 2005-116085 (hereinafter referred to as Prior Art Document 1) discloses the use of a retract capacitor charged by a power supply, as a current source (or voltage source) allowing the head to be unloaded when the power supply is interrupted. Prior Art Document 1 discloses that the distance that the unloaded head rebounds toward the disk as a result of collision against the stopper of the ramp varies depending on the ambient temperature of the device.

In the head unload technique described in Prior Art Document 1 (this technique is hereinafter referred to as the first head unload technique), the retract capacitor starts discharging in accordance with the interruption of the power supply to the disk driver. The discharge from the retract capacitor is continued for a duration determined by the detected ambient temperature (detection temperature). Then, a current output by the capacitor is supplied to a voice coil motor for the duration determined by the detection temperature. According to the first head unload technique, the head is unloaded under operation power corresponding to the detection temperature. Thus, the head rebound distance can be inhibited from exceeding a given value.

On the other hand, Jpn. Pat. Appln. KOKAI Publication No. 2005-174511 (hereinafter referred to as Prior Art Document 2) discloses a head unload technique for matching the moving speed of a head with a target speed when the head is unloaded (this technique is hereinafter referred to as a second head unload technique). The second head unload technique utilizes speed feedback control for detecting the head moving speed at a predetermined sampling period and based on the detected moving speed, matching the head moving speed with the target speed.

Prior Art Document 2 also discloses the calculation of the moving distance of the head based on the integration of the head moving speed detected at the predetermined sampling speed. Prior Art Document 2 also discloses determination of whether or not the head unload operation has been completed based on the calculated moving distance.

As described above, Prior Art Document 1 discloses the first head unload technique for inhibiting the head rebound distance from exceeding the given value when the head is unloaded in accordance with the interruption of the power supply. However, Prior Art Document 1 fails to disclose a mechanism for calculating the head rebound distance. On the other hand, Prior Art Document 2 discloses the mechanism for calculating the head moving distance from the head moving speed and based on the calculated moving distance, determining whether or not the head unload operation has been completed. However, Prior Art Document 2 fails to disclose a mechanism for calculating the head rebound distance.

Thus, to measure the head rebound distance according to the conventional art, it is necessary to open a housing for the disk drive in the room temperature environment and record the operation of disk drive. Furthermore, according to the conventional art, the number of disk drives that can be measured and a measurement environment are limited. In a high-temperature environment, the sliding resistance between the head and the ramp is low, resulting in an increased rebound distance. Thus, according to the conventional art, measuring the head rebound distance in the high-temperature environment is difficult.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, a disk drive is provided. The disk drive comprises: a search module configured to search for a timing when a moving direction of a head changes in such a manner that a first timing when the head collides against a stopper of a ramp during a head unload operation and a second timing when the head rebounds as a result of the collision are detected; and a calculation module configured to calculate a rebound distance that the head has rebounded based on the first timing and the second timing.

Figure 1:
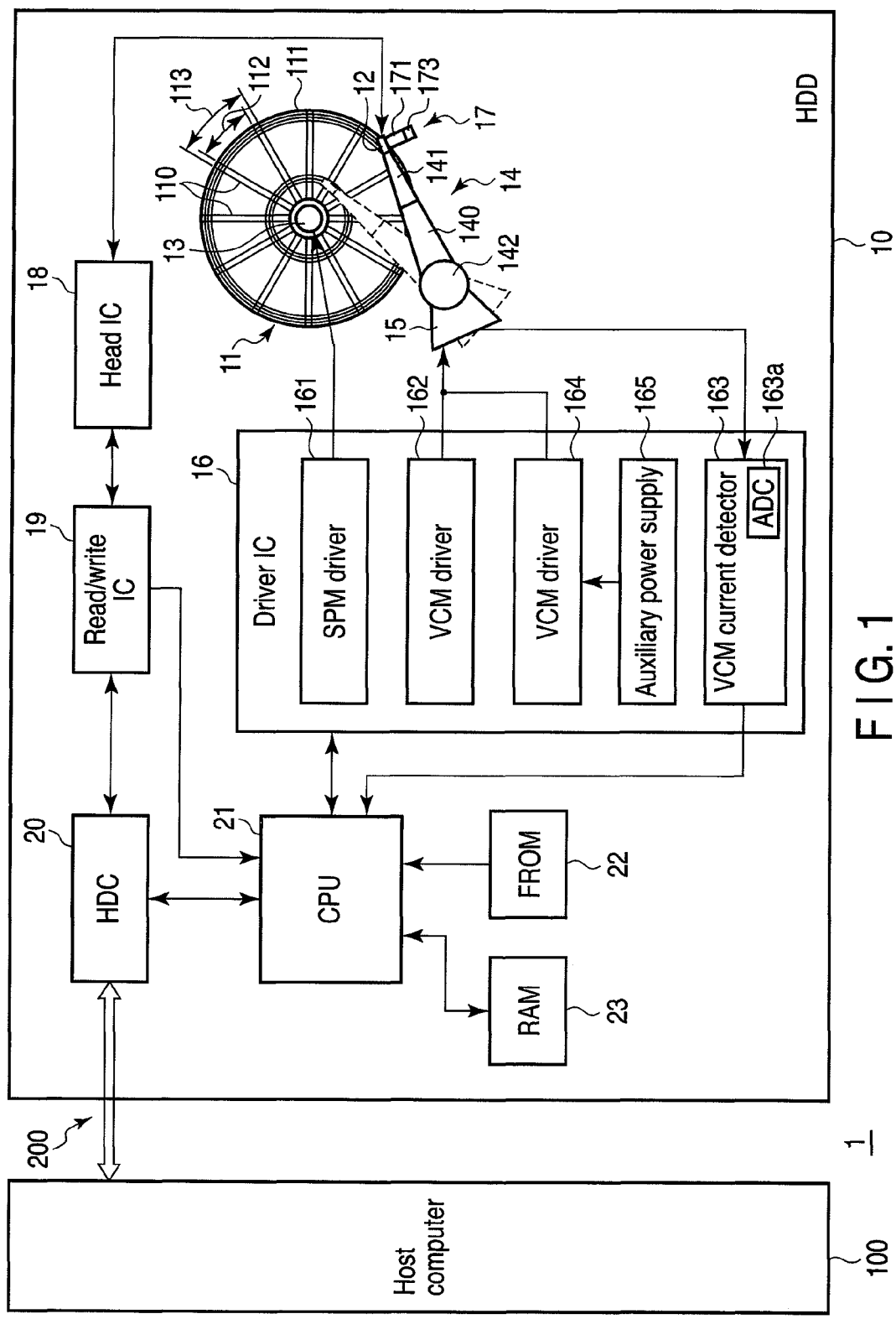
FIG. 1 is a block diagram showing an exemplary configuration of a system comprising a magnetic disk drive (HDD) according an embodiment of the invention.

FIG. 1 is a block diagram showing the configuration of a system 1 comprising a magnetic disk drive according to an embodiment of the invention. The system 1 comprises a magnetic disk drive 10 and a host computer 100. That is, the embodiment assumes that a magnetic disk drive (hereinafter referred to as HDD) 10 is used as the disk drive in the system 1. HDD 10 is connected to the host computer 100 via a host interface 200.

HDD 10 includes a disk (magnetic disk) 11 as a recording medium. The disk 11 has two surfaces, i.e., an upper surface and a lower surface. The upper surface, for example, of the disk 11 serves as a recording surface on which data is magnetically recorded. A head (magnetic head) 12 is provided opposite the recording surface of the disk 11. The head 12 is used to read and write data from and to the disk 11. For convenience of illustration, FIG. 1 shows an example of HDD 10 which incorporates only one head 12. In general, however, both sides of the disk 11 serve as recording surfaces, and the heads are provided in association with the respective disk surfaces. Furthermore, in the configuration in FIG. 1, HDD 10 is assumed to include a single disk 11. However, HDD 10 may incorporate a plurality of stacked disks 11.

The disk 11 is spun, for example, counterclockwise at high speed by a spindle motor (SPM) 13. The head 12 is attached to the tip of an actuator 14. More specifically, the head 12 is attached to a suspension 141 extending from an arm 140 incorporated in the actuator 14. The head 12 flies above the disk 11 because the disk 11 is spun at high speed.

The actuator 14 is supported rotatably around a pivot 142. The actuator 14 includes a voice coil motor (VCM) 15 used as a drive source for the actuator 14. VCM 15 (more specifically, a coil in VCM 15) is supplied with a current (hereinafter referred to as a drive current) or a voltage (hereinafter referred to as a drive voltage) to generate an electromagnetic force, allowing the actuator 14 to rotate around the pivot 142. The head 12 rotates integrally with the actuator 14 to move radially over the disk 11. That is, the actuator 14 supports the head 12 such that the head 12 can move radially over the disk 11. This operation of the actuator 14 allows the head 12 to be positioned at any radial position over the disk 11. SPM 13 and VCM 15 are driven by respective drive currents (or drive voltages) supplied (or applied) by a motor driver IC 16. The motor driver IC 16 will be described below in detail.

On the recording surface of disk 11, a plurality of servo areas 110 are provided, extending in the radial direction of the disk 11 and equidistantly spaced apart in the circumferential direction of the disk 11. Servo data is magnetically prewritten to each of the servo areas 110. FIG. 1 shows 12 servo areas 110 for convenience of illustration. However, recent HDDs generally include more than 100 servo areas 110.

The servo data is used to controllably position the head 12 at any radial position on the disk 11 being rotated by SPM 13. The positioning enables the head 12 to be moved over the recording surface of the disk 11 along concentric circles 111 (that is, the head 12 follows the concentric circles 111).

While following the concentric circles 111, the head 12 writes or reads data to or from the areas on the concentric circles 111 other than the servo areas 110 (the areas other than the servo areas are hereinafter referred to as user data areas). The combination of each of the servo areas 110 on the concentric circles 111 and a user data area 112 adjacent thereto is called a servo sector 113. The areas on the concentric circles 111 on the recording surface of the disk 11 are called tracks. In the description below, the tracks are denoted as the tracks 111. In FIG. 1, the tracks 111 positioned in the radially-central circumferential portion of the disk 11 are omitted for convenience of illustration.

A ramp 17 is located away from the recording surface of the disk 11, for example, close to the outer circumference of the disk 11. The ramp 17 provides a retract area (parking area) 171 in which the head 12 is placed while HDD 10 is inactive. The inactive state includes the state in which the operation of HDD 10 is completely stopped as is the case with the interruption of a power supply to HDD 10, as well as the state of HDD 10 in a particular power saving mode. The particular power saving mode is set autonomously in HDD 10 or in accordance with an instruction from the host computer 100.

A portion of the head 11 retracted to the ramp 17 is called a tab. In the embodiment, the head 12 includes the tab in addition to a read element and a write element. Thus, in the embodiment, the head 12 is retracted to the ramp 17.

The operation of retracting the head 12 to the ramp 17 is called a head unload operation or simply an unload operation. The head unload operation is roughly classified into a constant-speed head unload operation (or constant-speed unload operation) and a constant-acceleration head unload operation (or a constant-acceleration unload operation). The constant-speed unload operation is performed based on an unload command issued by, for example, CPU 21 or the host computer 100 while the power supply to HDD 10 is not interrupted. The constant-speed unload operation is performed by using the power supply voltage of HDD 10 to drive VCM 15. The constant-acceleration unload operation is performed in accordance with the interruption of the power supply to HDD 10. The constant-acceleration unload operation is performed by using the power supply voltage of an auxiliary power supply 165 described below to drive VCM 15.

Figure 3:
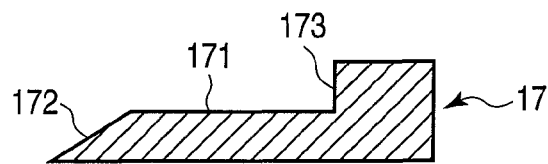
FIG. 3 is a diagram showing an exemplary cross section of a ramp.

FIG. 3 shows a cross section of the ramp 17 taken along the radial direction of the disk 11. A portion of the ramp 17 located close to the disk 11 corresponds to an inclined surface 172 along which the head 12 is smoothly guided from the disk 11 to the ramp 17 during the unload operation (head unload operation). A flat portion leading to the inclined surface 172 corresponds to a parking area 171. A portion of the ramp 17 leading to the parking area 171 and located opposite the inclined surface 172 projects from the parking area 171. The projecting portion of the ramp 17 corresponds to a stopper 173 with which the unloaded head 12 is engaged to stop movement of the head 12.

The head 12 is connected to a head IC (or head amplifier circuit) 18 via a wiring pattern formed on a flexible printed cable (FPC; not shown in the drawings). The head IC 18 includes a read amplifier configured to amplify read signals read from the head 12 and a write amplifier configured to convert write data into a write current (neither of the read and write amplifiers is shown in the drawings).

The head IC 18 is connected to a read/write IC (or read/write channel) 19. The read/write IC 19 is a signal processing module configured to execute various signal processes. More precisely, the read/write IC 19 executes an analog-to-digital conversion process of converting read signals amplified by the head IC 18 into digital data. The read/write IC 19 executes a servo detection process of extracting servo data from the digital data and a decoding process of decoding the digital data (read data). The read/write IC 19 executes an encoding process of encoding write data.

The read/write IC 19 is connected to the disk controller (HDC) 20 and CPU 21. HDC 20 is connected to CPU 21. HDC 20 is also connected to the host computer 100 via the host interface 200.

HDC 20 provides the interface control function of controlling reception of commands (e.g., a write command and a read command) transferred by the host computer 100 via the host interface 200 and data transfers between the host computer 100 and HDC 20. HDC 20 also provides the disk control function of controlling data transfers between the disk 11 and the HDC 20 performed through the read/write IC 19. Furthermore, HDC 20 includes an interface with CPU 21.

CPU 21 is connected to the motor driver IC 16 and to a flash ROM (FROM) 22 and RAM 23. A control program (firmware) to be executed by CPU 21 is pre-stored in FROM 22. RAM 23 provides a storage area for the operation of CPU 21. CPU 21 executes the control program stored in FROM 22 to function as a main controller for HDD 10.

The motor driver IC 16 includes an SPM driver 161, a VCM driver (first VCM driver) 162, a VCM current detector 163, a VCM driver (second VCM driver) 164, and the auxiliary power supply 165. The SPM driver 161 supplies (or applies) a drive current (or drive voltage) the amount of which is specified by CPU 21 to SPM 13. The VCM driver 162 supplies (or applies) a drive current (or drive voltage) the amount of which is specified by CPU 21 to VCM 15. The polarity of the drive current (or drive voltage) supplied (or applied) to VCM 15 by the VCM driver 162 varies between the head unload operation and a head load operation described below.

The VCM driver 162 is used for seek control, head positioning control (i.e., track following control), head load control, and constant-speed unload control (or constant-speed unload control) performed by CPU 21. The seek control is performed to move the head 12 to the target track 111 on the disk 11 corresponding to a data read/write target. In the seek control, CPU 21 specifies the target track, and arithmetically generates a control parameter indicative of a drive current (or drive voltage) required to move the head 12 from the current position to the target track 111. CPU 21 then sets the control parameter for the VCM driver 162. The VCM driver 162 supplies (or applies) the drive current (or drive voltage) indicated by the set control parameter to VCM 15 to drive VCM 15, thus rotating the actuator 14. Thus, the head 12 moves over the disk 11 in the radial direction of the disk 11.

At this time, the head 12 reads information magnetically recorded on the disk 11 to output the information as a read signal. The head IC 18 amplifies the read signal. The read/write IC 19 converts the amplified read signal into digital data and extracts servo data from the digital data. Based on the servo data extracted by the read/write IC 19, CPU 21 detects the current position of the head 12 (more specifically, the radial position of the head 12 over the disk 11). CPU 21 arithmetically generates a control parameter once again to move the head 12 from the detected current position of the head 12 to the target track 111. Then, the seek control is performed to move the head 12 to the target track 111 as described above.

The head positioning control is performed to settle the head 12 moved to the target track 111, within the target range of the target track 111. The head load control is performed for the head load operation of moving the head 12 retracted to the ramp 17 onto the disk 11. The constant-speed unload control is performed for the constant-speed unload operation of retracting the head 12 positioned on the disk 11 to the ramp 17 at a constant speed. The constant-speed unload control is based on feedback control for moving the head 12 at a predetermined head moving speed (i.e., the target speed).

The VCM current detector 163 detects a current (hereinafter referred to as a VCM current) flowing through the coil in VCM 15 at a predetermined sampling period $\Delta T$. The VCM current detector 163 comprises, for example, an analog-to-digital converter (ADC) 163a. The VCM current detector 163 executes analog-to-digital conversion whereby the ADC 163a converts the VCM current into digital data at the predetermined sampling period $\Delta T$. The VCM current detector 163 thus outputs a time series of VCM currents.

The VCM driver 164 supplies (applies) a constant drive current (or drive voltage) to VCM 15 in accordance with the interruption of the power supply to HDD 10, to control the constant-acceleration unload operation for unloading the head 12 onto the ramp 17 at a constant acceleration. It should be noted that unlike the constant-speed unload operation, the constant-acceleration unload operation uses open loop control instead of the feedback control. The drive current (or drive voltage) supplied (or applied) to VCM 15 by the VCM driver 164 during the constant-acceleration unload operation is specified by CPU 21 when, for example, HDD 10 is started.

Even though the constant drive current (or drive voltage) is supplied (applied) to VCM 15 by the VCM driver 164, a VCM current (or a VCM voltage corresponding to the voltage across the coil in VCM 15) actually flowing through the coil in VCM 15 is not necessarily constant. This is because driving of VCM 15 causes a back electromotive force (back-EMF) to be generated in (the coil in) VCM 15, causing a back-EMF current (or back-EMF voltage) to be added to the constant drive current (or drive voltage) externally supplied (applied) to VCM 15. The polarity of the back-EMF current (or back-EMF voltage) varies depending on the direction in which VCM 15 is driven, that is, the direction in which the actuator 14 is rotated.

In the constant-acceleration unload operation, when unloaded onto the ramp 15 at a constant acceleration, the head 12 may collide against the stopper 173 of the ramp 17 to rebound far in the direction opposite to the head unload direction (that is, in the head load direction). Thus, it is important that in the constant-acceleration unload operation, the drive current (or drive voltage) supplied (applied) to VCM 15 by the VCM driver 164 be adjusted such that the rebound distance is smaller than a given value.

The auxiliary power supply 165 is enabled in accordance with the interruption of the power supply to HDD 10 and used as a power supply for the operation of the VCM driver 164. The auxiliary power supply 165 comprises, for example, a capacitor in which charges are normally accumulated by the power supply voltage of HDD 10 (that is, the auxiliary power supply 165 is charged by the power supply voltage of HDD 10). The auxiliary power supply 165 may comprise a rectifier configured to rectify the back-EMF generated in SPM 13 by rotation of SPM 13. Even if the supply of a current to SPM 13 is interrupted, the back-EMF of SPM 13 is generated while SPM is rotating under the action of an inertia force. Thus, the back-EMF of SPM 13 can be used as the auxiliary power supply 165.

Figure 2:
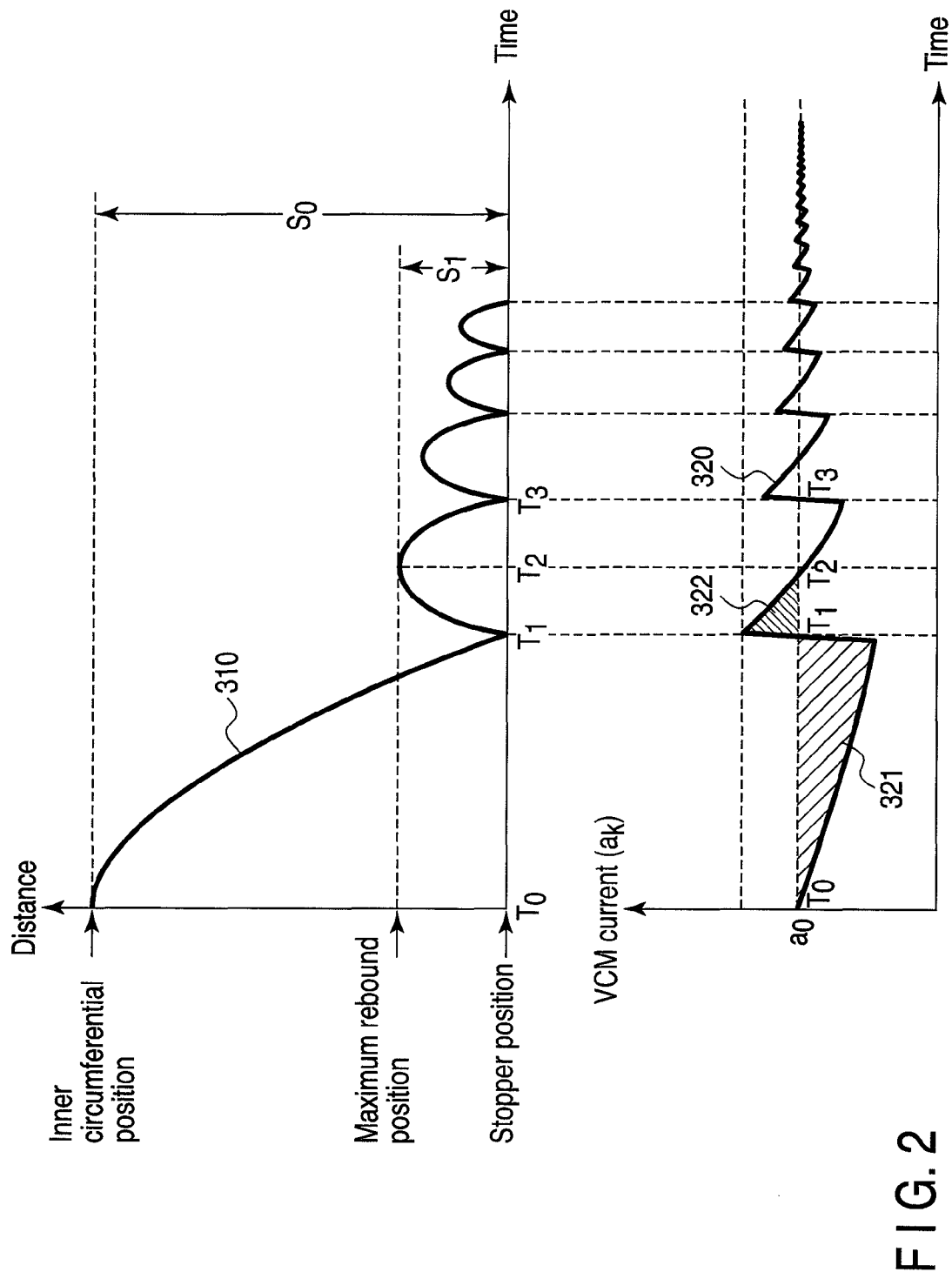
FIG. 2 is a diagram schematically illustrating an exemplary mechanism for adjusting the rebound distance of a head when the head is unloaded at a constant acceleration.

Now, the mechanism for adjusting the rebound distance of the head 12 when the head 12 is unloaded onto the ramp 17 at a constant acceleration will be described in brief with reference to FIG. 2. FIG. 2 shows an example of the correspondence relationship between a temporal variation in the locus (head movement locus) 310 of the position (head position) of the head 12 and the waveform of the VCM current (VCM current waveform) 320. The relationship is observed when the head 12 is unloaded from the inner circumference of the disk 11 at a constant acceleration. The constant-acceleration unload operation is performed by externally supplying a constant drive current $a_0$ to VCM 15.

In FIG. 2, in a chart showing the head movement locus 310, the axis of abscissa indicates time, and the axis of ordinate indicates the head position. In a chart showing the VCM current waveform 320, the axis of abscissa indicates time, and the axis of ordinate indicates the VCM current. Furthermore, in FIG. 2, time $T_0$ denotes the time when the constant-acceleration unload operation is started. The moving speed of the head 12 (that is, the rotation speed of VCM 15) at time $T_0$ is 0 (cm/s). The VCM current at time $T_0$ corresponds to a drive current $a_0$. That is, at time T0, the current a0 flows through VCM 15 (more specifically, through the coil in VCM 15).

When unloaded from the inner circumference of the disk 11, the head 12 moves from the inner circumference to outer circumference of the disk 11 and along the inclined surface 172 of the ramp 17. The head 12 then reaches the parking area 171. Then, at time $T_1$, the head 12 collides against the stopper 173 of the ramp 17.

Then, between time $T_1$ and time $T_2$, the head 12 rebounds in the direction opposite to the unload direction (that is, in the load direction). However, during the constant-acceleration unload operation, the constant drive current (or drive voltage) with a polarity required to unload the actuator 14 is externally supplied (applied) to VCM 15. This reduces the rebound speed of the head 12. At time $T_2$, the head 12 moves toward the stopper 173 of the ramp 17 again, and at time $T_3$, collides against the stopper 173 again. At the time of the collision, the moving speed of the head 12 is 0 (cm/s). At time $T_2$, the moving speed of the head 12 having rebounded the stopper 173 temporarily becomes 0 (cm/s), that is, the head 12 temporarily comes to rest.

The head 12 repeats these operations and is finally pressed against the stopper 173. Thus, the maximum redound distance of the head 12 is between the stopper 173 and the position of the head 12 observed at time $T_2$. The position of the head 12 observed at time T2, that is, the position of the head 12 having rebounded farthest from the stopper 173, is called the maximum rebound position. Desirably, the maximum rebound position is not located outside the parking area 171 of the ramp 17, that is, the head 12 does not move beyond the parking area 171 of the ramp 17 back onto the inclined surface 172 or the disk 11.

As described above, when VCM 15 is driven to move the head 12, the rotation of VCM 15 causes a back-EMF to be generated in VCM 15. Then, the back-EMF current (or back-EMF voltage) is added to the drive current (or drive voltage) externally supplied (or applied) to VCM 15. That is, the VCM current flowing through VCM 15 (or the VCM voltage of VCM 15) changes from the value of the drive current (or drive voltage) by the value of the back-EMF current (or back-EMF voltage).

In the example shown in FIG. 2, between time $T_0$ and time $T_1$, the VCM current changes from $a_0$ by the value of the added back-EMF current. The back-EMF generated in VCM 15 is proportional to the rotation speed of VCM 15, that is, the moving speed of the head 12. Thus, between time $T_0$ and time $T_1$, the VCM current waveform 320 varies linearly from $a_0$ over time.

Between time $T_1$ and time $T_2$, the VCM current waveform 320 varies, around $a_0$, in a manner opposite to that of the variation between time $T_0$ and time $T_1$. The variation between time $T_1$ and time $T_2$ means that since at time $T_1$, the head 12 collides against and rebounds from the stopper 173 of the ramp 17, VCM 15 rotates in the direction opposite to that of the rotation between time $T_0$ and time $T_1$, thus changing the polarity of the back-EMF (back-EMF current).

Based on the above-described events, the inventors propose a mechanism that utilizes two pieces of knowledge described below in (a) and (b) to calculate the maximum rebound distance and based on the result of the calculation, adjusts the drive current (or drive voltage) supplied (or applied) to VCM 15.

(a) The moving direction of the head 12 can be detected based on the direction of a variation in VCM current from $a_0$. When the VCM current is equal to $a_0$, it can be assumed that the head 12 is stopped or collides against the stopper 173 and that the moving speed of the head 12 is zero.

(b) As is well known, the back-EMF of VCM 15 is proportional to the rotation speed of VCM 15, that is, the moving speed of the head 12. Thus, the variation in VCM current from $a_0$ in FIG. 2 is proportional to the moving speed of the head 12. Consequently, a value (integral value) obtained by integrating the variation in VCM current from $a_0$ can be assumed to be proportional to the moving distance of the head 12.

In FIG. 2, a hatched portion 321 indicates a value (hereinafter referred to as an integral value 321) obtained by integrating the variation in VCM current from $a_0$ between time $T_0$ and time $T_1$. The integral value 321 is proportional to a moving distance $S_0$ that the head 12 has moved from the inner circumference of the disk 11 to the stopper 173 of the ramp 17. Furthermore, in FIG. 2, a hatched portion 322 indicates a value (hereinafter referred to as an integral value 322) obtained by integrating the variation in VCM current from $a_0$ between time $T_1$ and time $T_2$. The integral value 322 is proportional to the maximum rebound distance. That is, the integral value 322 indicates a relative maximum rebound distance $S_1$.

The VCM current waveform shown in FIG. 2 may be replaced with a back-EMF current waveform. In this case, $a_0$ may be set to zero. The back-EMF current can be calculated by, for example, allowing CPU 21 to subtract the VCM current $a_0$ (that is, the VCM current at time $T_0$) from the VCM current $a_k$. However, a back-EMF current detector configured to detect back-EMF currents may be used instead of the VCM current detector 163.

Furthermore, the VCM current waveform shown in FIG. 2 may be replaced with a VCM voltage waveform, and the VCM current detector 163 may be replaced with a VCM voltage detector configured to detect VCM voltages. In this case, in the above description, the VCM current $a_k$ may be replaced with a VCM voltage $a_k$. In the VCM voltage waveform, $a_0$ denotes the drive voltage applied to VCM 15 (that is, the VCM voltage at time $T_0$). Additionally, the VCM voltage waveform may further be replaced with the back-EMF voltage corresponding to the back-EMF generated in VCM 15. The back-EMF voltage can be calculated by, for example, allowing CPU 21 to subtract the VCM voltage $a_0$ (that is, the VCM voltage at time $T_0$) from the VCM voltage $a_k$. However, a back-EMF voltage detector configured to detect back-EMF voltages may be used instead of the VCM voltage detector.

Now, with reference to the flowchart in FIG. 4, description will be given of the procedure of a process (VCM voltage adjustment process) of calculating the maximum rebound distance $S_1$ and based on the result of the calculation, adjusting the VCM voltage (more specifically, the drive voltage to be applied to VCM 15). In the embodiment, the VCM voltage adjustment process is executed mainly by CPU 21 of HDD 10 when CPU 21 receives a relevant instruction from the host computer 100. Here, the VCM voltage adjustment process is executed during a manufacture inspection step preceding the shipment of HDD 10, for example, during a heat run test step. More specifically, the VCM voltage adjustment process is executed during the heat run test step in such a high-temperature environment as reduces the sliding resistance between the head 12 and the ramp 17, thus increasing the rebound distance.

Upon being instructed by the host computer 100 to execute the VCM voltage adjustment process, CPU 21 starts the VCM voltage adjustment process based on a particular control program stored in FROM 22. In the embodiment, to start the VCM voltage adjustment process, CPU 21 controls the VCM driver 162 such that the head 12 is positioned on the inner circumference of the disk. Thus is because when unloaded from a portion of inner circumference of the disk 11 located farthest from the ramp 17, onto the ramp 17 at a constant acceleration, the head 12 rebounds farthest from the stopper 173 of the ramp 17.

In the VCM voltage adjustment process, CPU 21 utilizes the VCM driver 162 in the motor driver IC 16 like the VCM driver 164, which operates in accordance with the interruption of the power supply to HDD 10. First, CPU 21 functions as a control parameter setting module. Thus, CPU 21 initially sets a control parameter indicating a constant drive voltage V required for constant-acceleration unloading, in a register (not shown in the drawings) of the VCM driver 162 (block 401). The initial value of the control parameter (hereinafter referred to as a first control parameter) is predetermined and indicates a standard voltage common at least to all HDDs 10 of the same type. That is, in block 401, the drive voltage is initially set to be equal to the standard voltage. In the embodiment, the first control parameter is assumed to be pre-stored in a first area of FROM 22 in each HDD 10. In block 401, CPU 21 reads the first control parameter stored in the first area of FROM 22 and sets the control parameter in the VCM driver 162.

Then, CPU 21 functions as a constant-acceleration unload control module. Thus, CPU 21 starts the constant-acceleration unload control to allow the head 12 to be unloaded at a constant acceleration using the drive voltage V indicated by the control parameter set in the VCM driver 162 (block 402). More specifically, CPU 21 sets the VCM driver 162 to an enabled state. In the enabled state, the VCM driver 162 applies the drive voltage V indicated by the control parameter set in the VCM driver 162, to VCM 15. Thus, VCM 15 is driven to start a constant-acceleration unload operation of unloading the head 12 at a constant acceleration.

Then, CPU 21 acquires a time series (VCM current time series) of VCM currents $a_k$ (k=0, ..., N) (block 403). The VCM current $a_k$ is detected by the VCM current detector 163 during the constant-acceleration unload operation (more specifically, during a given period from the beginning of the constant-acceleration unload operation) at the predetermined sampling period $\Delta T$. The given period is a sample period with a length denoted as $N \cdot \Delta T$. Here, the suffix "k" to the symbol "a" in the VCM current $a_k$ is called an index for the VCM current time series. The index "k" indicates the sample number of the VCM current $a_k$ corresponding to the kth sample in the VCM current time series. The time when the 0th sample (VCM current $a_0$) with an index 0 (k=0) (this time is hereinafter referred to as a sample time) is sampled corresponds to time $T_0$ in FIG. 2. That is, index 0 also indicates the sample time corresponding to time $T_0$. The VCM current $a_0$ (k=0) is the VCM current obtained at time $T_0$ in FIG. 2. Similarly, index "k" also indicates a sample time when "k×sampling period $\Delta T$" (that is, $k \cdot \Delta T$) elapses after the sample time (time T0) indicated by index 0. That is, index "k" indicates the sample time of the corresponding sample determined relative to time $T_0$.

Then, CPU 21 functions as a search module. Thus, based on the VCM current time series, CPU 21 utilizes the knowledge (a) described with reference to FIG. 2 to execute a head moving direction reversal timing search process (block 404). The head moving direction reversal timing search process searches for (that is, detects) time $T_1$ when the head 12 collides against the stopper 173 of the ramp 17 for the first time and time $T_2$ when the rebound distance of the head 12 is maximized, based on the VCM current time series. At time $T_2$, the moving speed of the head 12 having collided against and rebounded from the stopper 173 for the first time becomes zero. In the VCM current time series, the magnitude correlation with the VCM current $a_0$ at time $T_0$ changes at both time $T_1$ and time $T_2$.

Like index "k", both $T_1$ and $T_2$ indicate sample times determined relative to index 0 (time $T_0$). Here, time $T_1$ and time $T_2$, that is, times when the VCM current is equal to $a_0$ and the head moving speed of the head 12 is assumed to be 0 (cm/s), are denoted as $T_L$. $T_L$ also indicates a sample time determined relative to index 0 (time $T_0$). The suffix to the symbol T is also referred to as an index. If the head moving direction reversal timing search process fails to detect $T_1$ and $T_2$, then in the embodiment, $T_1$ and $T_2$ are set to N+1. The head moving direction reversal timing search process will be described below in detail.

Then, CPU 21 functions as an adjustment module. Thus, CPU 21 determines whether or not the head 12 has been pressed against the stopper 173 of the ramp 17 during the sample period corresponding to the VCM current time series (block 405). In the embodiment, the determination in block 405 is performed by determining whether or not the values for time $T_1$ and time $T_2$ detected in block 404 are smaller than that for index N (that is, sample time N) corresponding to the VCM current $a_N$ (k=N).

If the determination in block 405 is No, that is, $T_1 > N$ and/or $T_2 > N$ is detected, CPU 21 determines that the drive voltage V currently applied to VCM 15 is insufficient. In this case, CPU 21 increases the driven voltage V applied to VCM 15 by the VCM driver 162 (block 406). More specifically, CPU 21 changes the control parameter currently set in the VCM driver 162 such that the corresponding drive voltage V is increased. CPU 21 then returns to block 402.

On the other hand, if the determination in block 405 is Yes, that is, $T_1 \leq N$ and $T_2 \leq N$ are detected, then CPU 21 proceeds to block 407. In block 407, CPU 21 functions as a calculation module. Thus, CPU 21 utilizes the knowledge (b) described with reference to FIG. 2 to calculate the maximum rebound distance $S_1$. The calculated maximum rebound distance $S_1$ is a relative distance proportional to the absolute distance.

Then, CPU 21 functions as the adjustment module again. Thus, CPU 21 compares the maximum rebound distance $S_1$ calculated in block 407 with a predetermined threshold $S_{criteria}$. Based on the result of the comparison, CPU 21 determines whether or not the maximum rebound distance S1 is less than or equal to the threshold $S_{criteria}$ (block 408). If the maximum rebound distance S1 is less than or equal to the threshold $S_{criteria}$ (Yes in block 408), CPU 21 enters a control parameter (hereinafter referred to as a second control parameter) indicative of the drive voltage V currently applied to VCM 15 by the VCM driver 162, in a second area of FROM 22 (block 410). The VCM voltage adjustment process is thus finished. The first control parameter stored in FROM 22 may be updated to the second control parameter.

On the other hand, if the maximum rebound distance S1 is not less than or equal to the threshold $S_{criteria}$ (No in block 408), CPU 21 determines that the speed at which the head 12 collides against the stopper 173 of the ramp 17 is excessively high. In this case, CPU 21 allows the VCM driver 162 to reduce the drive voltage V applied to VCM 15 (block 409). That is, CPU 21 changes the control parameter currently set in the VCM driver 162 such that the corresponding voltage V decreases. CPU 21 then returns to block 402.

As described above, CPU 21 repeatedly calculates the maximum rebound distance S1 while controlling an increase and reduction in the voltage V applied to VCM 15. Through this repetition, CPU 21 determines the optimum drive voltage V for HDD 10 at which the maximum rebound distance $S_1$ is less than or equal to the threshold $S_{criteria}$.

Subsequently, every time HDD 10 is powered on and started, CPU 21 sets the second control parameter in the VCM driver 164. The second control parameter is entered in FROM 22 by the execution of the above-described VCM voltage adjustment process. Then, if the power supply to HDD 10 is interrupted, the VCM driver 164 operates as follows. The VCM driver 164 is operated by the voltage applied by the auxiliary power supply 16 to apply the optimum drive voltage V for HDD 10 indicated by the second control parameter set at the time of power-on of HDD 10, to VCM 15. Then, the head 12 is unloaded onto the ramp 17 at a constant acceleration. At this time, the maximum rebound distance of the head 12 is smaller than the given value (that is, threshold $S_{criteria}$). Thus, the head 12 can be prevented from rebounding beyond the inclined surface 172 of the ramp 17 onto the disk 11.

Now, the procedure of the head moving direction reversal timing search process executed in block 404 in the flowchart of FIG. 4 will be described with reference to the flowchart in FIG. 5. First, CPU 21 initializes index "k", index L and times $T_0$ to $T_2$ in the first area of RAM 23 (block 501). In the embodiment, index "k" is initialized to zero so as to indicate the sample time of the leading sample (VCM current $a_0$) in the VCM current time series. That is, index "k" is initialized to zero so as to indicate the sample time of the leading sample in the VCM current time series. Similarly, index L is initialized to zero so as to indicate the index of time $T_0$. Similarly, time $T_0$ is initialized to "k" (here, k=0), and time $T_1$ and time $T_2$ are initialized to the maximum index N+1 in the VCM current time series, that is, to the maximum sample time N+1.

Then, CPU 21 increments index "k" by one (block 502). CPU 21 then determines whether or not the VCM current $a_k$ indicated by the incremented index "k" is equal to the current $a_0$ or the VCM current $a_k$ equals $a_0$ between index (sample time) "k−1" and index (sample time) "k" (block 503). The determination in block 503 is performed by checking whether or not $(a_{k-1}-a_0)(a_k-a_0)$ is less than or equal to zero.

If the determination in block 503 is Yes, CPU 21 determines that the magnitude correlation between $a_k$ and a0 is reversed between index "k−1" and index "k". In this case, CPU 21 enters index "k", in the second area of RAM 23, as an index corresponding to time $T_L$ when the head 12 collides against the stopper 173 of the ramp 17 or when the head temporarily comes to rest after rebounding from the stopper 173. CPU 21 thus enters index "k" in the second area of RAM 23 (block 504). In block 504, CPU 21 increments index L by one.

CPU 21 executes block 504 and then proceeds to block 505. On the other hand, if the determination in block 503 is No, CPU skips 504 to proceed to block 505. In block 505, CPU 21 determines whether or not index L stored in the first area of RAM 23 is at least 2. CPU 21 thus determines whether or not at least two values of time $T_L$ have been entered (whether or not time $T_L$ has been entered at least twice). That is, CPU 21 determines whether or not two timings (hereinafter referred to as stopper collision timings) when the head 12 collides against the stopper 173 or two timings (hereinafter referred to as stationary timings) immediately before the head temporarily remaining stationary after having rebounded from the stopper 173 starts to move toward the stopper.

Time $T_1$ corresponds to the first stopper collision timing (first timing). Time $T_2$ corresponds to the first remaining-stationary timing (second timing) following the first stopper collision timing. Consequently, the information between $T_0$ and $T_2$ has only to be obtained. Thus, if the determination in block 505 is Yes, CPU 21 terminates the head moving direction reversal timing search process (block 404) and proceeds to block 405.

On the other hand, if the determination in block 505 is No, CPU determines whether or not the current index "k" exceeds N (block 506). If the determination in block 506 is Yes, CPU 21 determines that the information between $T_0$ and $T_2$ has failed to be obtained in spite of the search performed up to the last sample (VCM current $a_N$) in the VCM current time series. CPU 21 thus terminates the head moving direction reversal timing search process (block 404).

In contrast, if the determination in block 506 is No, CPU returns to block 402 to continue the search. If $T_2$ ($\leqq N$) has failed to be found in spite of the search performed up to the last sample (VCM current $a_N$) in the VCM current time series, T2 has the initial value N+1. Furthermore, if both $T_1$ and $T_2$ ($\leqq N$) have failed to be found, both $T_1$ and $T_2$ have the initial value N+1.

Thus, if neither the relation $T_1 \leqq N$ nor the relation $T_2 \leqq N$ is satisfied (No in block 405), CPU 21 determines the insufficiency of the moving speed of the head 12 in the head unloading at a constant acceleration and thus of the VCM voltage. In this case, CPU 21 increases the drive voltage V applied to VCM 15 by the VCM driver 162 (block 406) and then returns to block 402.

In contrast, if both $T_1 \leqq N$ and $T_2 \leqq N$ are satisfied (Yes in block 405), CPU 21 calculates the maximum rebound distance $S_1$ (block 407). In the embodiment, the maximum rebound distance $S_1$ is calculated to be the sum of $a_k \cdot \Delta T$ for all of k=$T_1$ to k=$T_2$. When the maximum absolute value of $a_k$ for all of k=$T_1$ to k=$T_2$ is denoted as max $|a_k|$, the maximum rebound distance $S_1$ may be approximated by $(1/2) \times (T_2 - T_1) \times$ max $|a_k|$.

The characteristics of rebound of the head 12 having collided against the stopper 173 vary depending on a time-dependent change in HDD 10. Thus, after HDD 10 is shipped, the above-described VCM voltage adjustment process may be executed in accordance with a time-dependent change in HDD 10 so that the second control parameter entered in FROM 22 can be updated so as to indicate the current optimum drive value V.

HDD 10 generally uses a function called Self-Monitoring, Analysis, and Reporting Technology (SMART) to collect and manage information (hereinafter referred to as SMART information) used to, for example, predict a possible defect in HDD 10. SMART information is stored in, for example, a management area formed in a part of the recording surface of the disk 11 and which is unavailable to users. SMART information includes the cumulative total value of energization durations measured since the start of the use and information indicative of the usage of HDD 10 such as the number of times HDD 10 has been started, that is, information indicative of a time-dependent change in HDD 10. Thus, for example, every time the cumulative total value of energization durations or the number of times HDD 10 has been started meets a predetermined condition, the VCM voltage adjustment process may be executed when HDD 10 is powered on for the first time after the predetermined condition has been met. In block 401 for the VCM voltage adjustment process, unlike in the case of the manufacture inspection step, CPU 21 may set the second control parameter entered in FROM 22, in the VCM driver 162 so that the drive voltage V indicated by the second control parameter can be applied to VCM 15 by the VCM driver 162.

[Modification]

Now, a modification of the above-described embodiment will be described. In the above-described embodiment, HDD 10 executes all of the head moving direction reversal timing search process and the VCM voltage adjustment process including the calculation of the maximum rebound distance $S_1$. However, the VCM voltage adjustment process during the manufacture inspection step may be shared by HDD 10 and the host computer 100.

Figure 6:
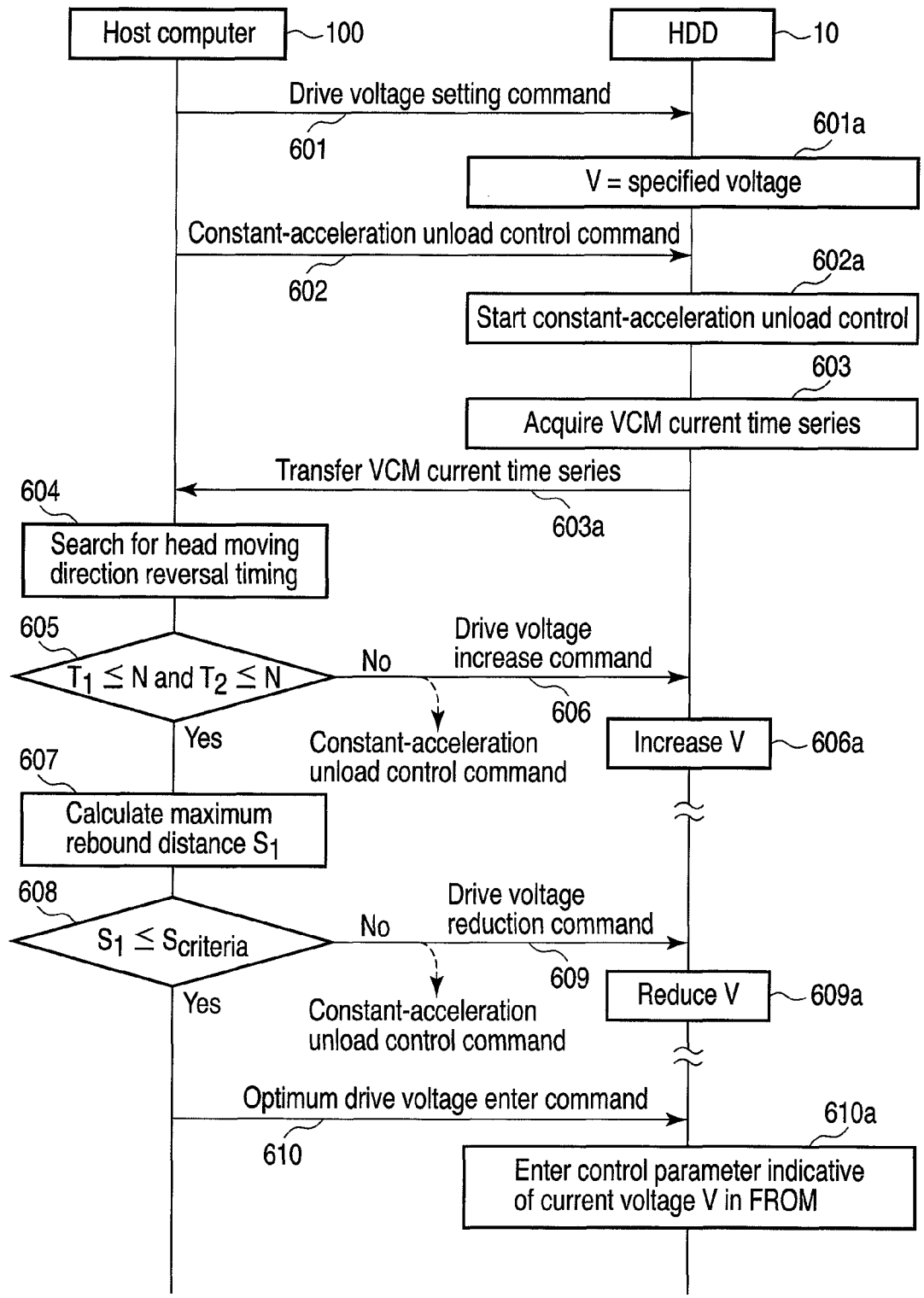
FIG. 6 is an exemplary sequence chart illustrating a VCM voltage adjustment process divisionally executed by HDD and a host computer during a manufacture inspection step.

Thus, the VCM voltage adjustment process divisionally executed by HDD 10 and the host computer 100 during the manufacture inspection step will be described below with reference to the sequence chart in FIG. 6. First, the host computer 100 issues, to HDD 10, a drive voltage setting command instructing HDD 10 to apply a predetermined standard drive voltage to VCM 15 (block 601). In accordance with the drive voltage setting command from the host computer 100, CPU 21 sets a control parameter indicative of the specified drive voltage V in the VCM driver 162 (block 601*a*).

Then, the host computer 100 issues, to HDD 10, a constant-acceleration unload control command instructing HDD 10 to control an unload operation at a constant acceleration (block 602). In accordance with the constant-acceleration unload control command from the host computer 100, CPU 21 starts constant-acceleration unload control to unload the head 12 at a constant acceleration using the drive voltage V indicated by the control parameter set in the VCM driver 162 (block 602*a*). CPU 21 then acquires a VCM current time series from the VCM current detector 163 (block 603). CPU 21 then transfers the VCM current time series to the host computer 100 via HDC 20 (block 603*a*).

Figure 4:
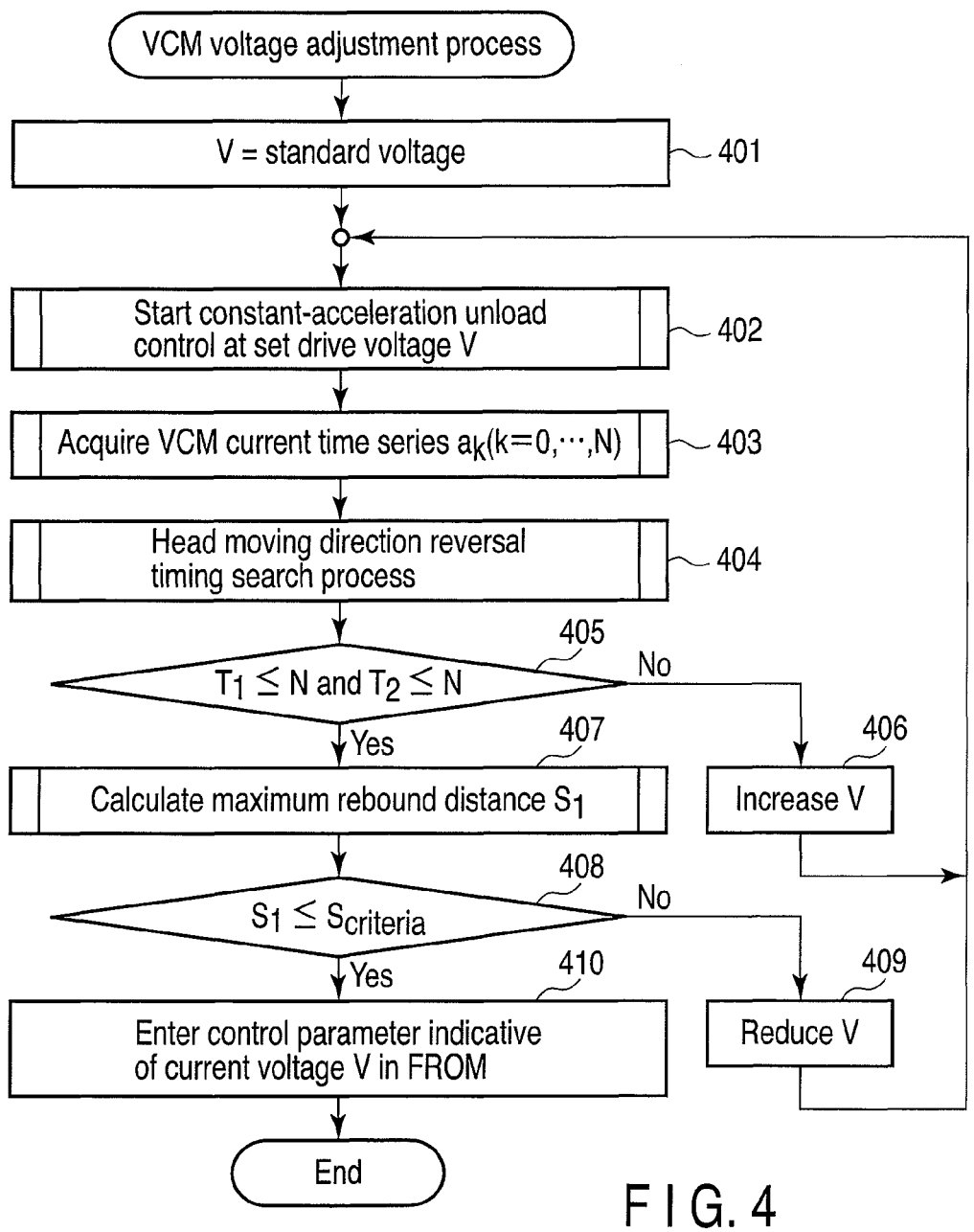
FIG. 4 is a flowchart showing an exemplary procedure for a VCM voltage adjustment process according to the embodiment.
Figure 5:
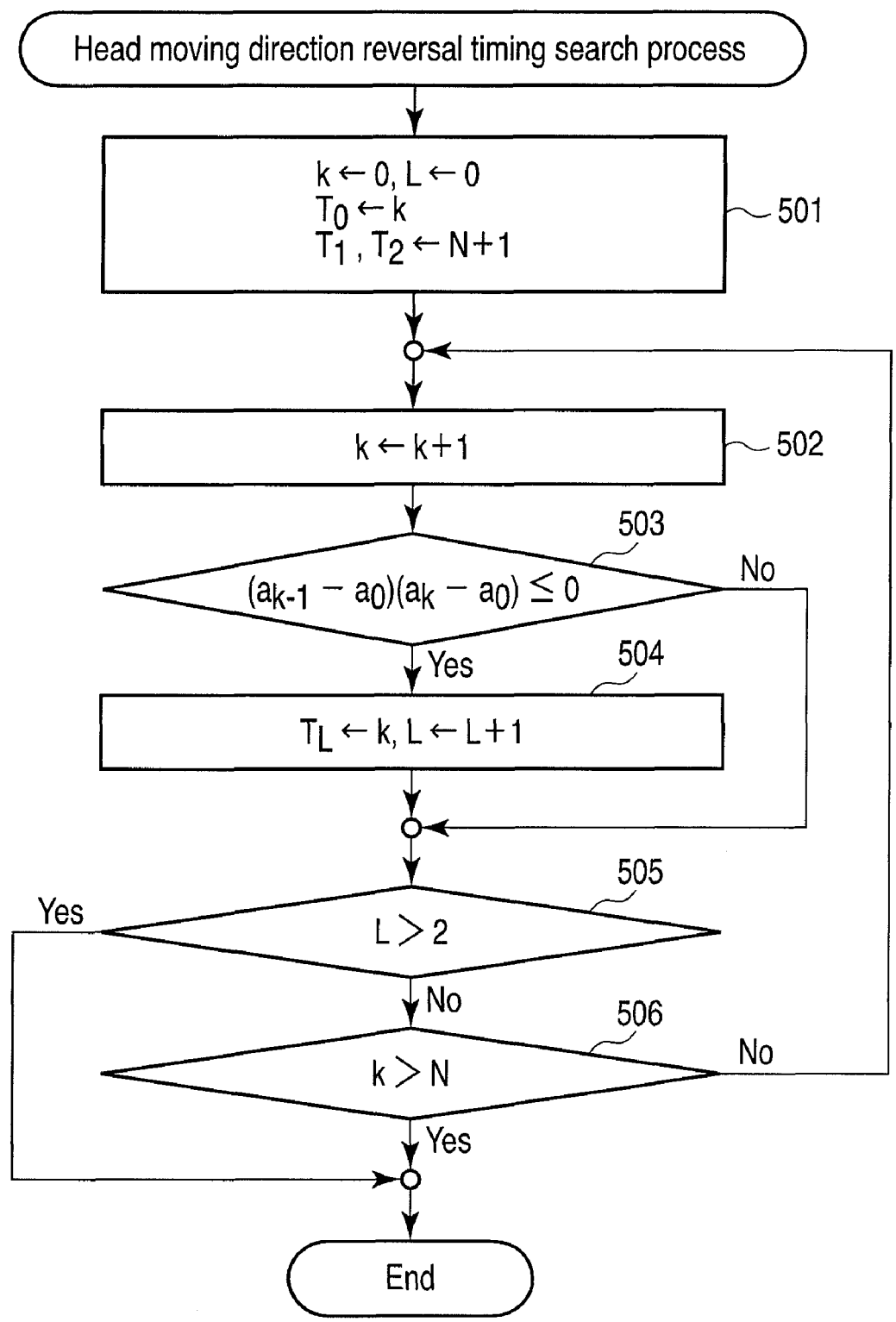
FIG. 5 is a flowchart showing an exemplary procedure for a head moving direction reversal timing search process.

Upon receiving the VCM current time series transferred by HDD 10, the host computer 100 repeats processing (blocks 604 to 609) corresponding to blocks 404 to 409 in the flowchart in FIG. 4 as required. However, in the processing (block 606) corresponding to block 406, the host computer 100 issues, to HDD 10, a drive voltage increase command instructing HDD 10 to increase the drive voltage V. Furthermore, in the processing (block 609) corresponding to block 409, the host computer 100 issues, to HDD 10, a drive voltage reduction command instructing HDD 10 to reduce the drive voltage V.

In accordance with the drive voltage increase command from the host computer 100, CPU 21 allows the VCM driver 162 to increase the drive voltage V applied to VCM 15 (block 606*a*). In accordance with the drive voltage reduction command from the host computer 100, CPU 21 allows the VCM driver 162 to reduce the drive voltage V applied to VCM 15 (block 609*a*).

It is assumed that the host computer 100 determines (detects), in the processing (block 608) corresponding to block 408, that the maximum rebound distance $S_1$ is less than or equal to the threshold $S_{criteria}$ (Yes in block 608). In this case, the host computer 100 issues, to HDD 10, an optimum drive voltage enter command instructing HDD 10 to enter the current value of the drive voltage as an optimum value inherent in HDD 10 (block 610). In accordance with the optimum drive voltage enter command from the host computer 100, CPU 21 enters a control parameter (second control parameter) indicative of the specified drive voltage in FROM 22 (block 610*a*).

In the above-described embodiment and its modification, the disk drive is assumed to be HDD (magnetic disk drive). However, a disk drive such as a magneto optical disk drive may be used instead of HDD provided that the disk drive performs a constant-acceleration unload operation.

The various modules of the disk drive described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A disk drive comprising:
a search module configured to search for when a moving direction of a head changes in order to detect a first point of time when the head collides against a stopper of a ramp during a head unloading and to detect a second point of time when the head rebounds as a result of the collision; and
a calculator configured to calculate a rebound distance indicative of a distance that the head has rebounded based on the first point of time and the second point of time, the rebound distance being used for adjusting rebound of the head.

2. The disk drive of claim 1, further comprising an adjuster configured to adjust the rebound distance smaller than a predetermined value.

3. The disk drive of claim 2, wherein the search module is configured to detect when the head collides against the stopper for the first time during the head unloading as the first point of time.

4. The disk drive of claim 3, further comprising a head unload controller configured to apply a constant drive voltage to a voice coil motor or to supply a constant drive current to the voice coil motor during the head unloading,
wherein the adjuster is configured to adjust the drive voltage or the drive current in order to control the rebound distance smaller than the predetermined value during the head unloading.

5. The disk drive of claim 4, further comprising a detector configured to detect a voice coil motor voltage or a voice coil motor current in the voice coil motor during the head unloading at a predetermined sampling period,
wherein the search module is configured to search for the time when the moving direction of the head changes based on a time series of a voice coil motor voltage or voice coil motor current detected by the detector.

6. The disk drive of claim 5, wherein the calculator is configured to calculate the rebound distance based on changes in the voice coil motor voltage or voice coil motor current from the drive voltage or drive current during a period between the first point of time and the second point of time.

7. The disk drive of claim 6, wherein the search module is configured to detect when the voice coil motor voltage or the voice coil motor current becomes substantially equal to a leading value in the time series for the first time except for a time to start the head unloading as the first point of time.

8. The disk drive of claim 7, wherein the search module is configured to detect when the voice coil motor voltage or the voice coil motor current becomes substantially equal to the leading value for the first time after the first point of time as the second point of time.

9. The disk drive of claim 6, wherein the calculator is configured to accumulate the changes between the first point of time and the second point of time in order to calculate the rebound distance.

10. The disk drive of claim 9, wherein the calculator is configured to approximate the accumulation of the changes by the product of the maximum of the changes between the first point of time and the second point of time, the duration between the first point of time and the second point of time, and ½.

11. The disk drive of claim 6, wherein the adjuster is configured to reduce the drive voltage or the drive current if the rebound distance exceeds the predetermined value.

12. The disk drive of claim 6, wherein:
the time series corresponds to a predetermined period related to when the control of the head unloading is started; and
the adjuster is configured to increase the drive voltage or the drive current if the search module fails to detect either the first point of time or the second point of time in the time series.

13. The disk drive of claim 4, further comprising:
a rewritable nonvolatile memory configured to store a control parameter indicative of the drive voltage or drive current adjusted by the adjuster; and
a voice coil motor driver configured to operate with an auxiliary power supply when a power supply to the disk drive is interrupted, and to apply a drive voltage or supply a drive current indicated by the control parameter in the nonvolatile memory to the voice coil motor.

14. The disk drive of claim 13, wherein:
the search module, the calculator, the adjuster, and the head unload controller are configured to operate during a manufacture inspection for the disk drive; and
the adjuster is configured to store a control parameter indicative of the current drive voltage or drive current in the nonvolatile memory if the rebound distance does not exceed the predetermined value.

15. The disk drive of claim 14, wherein the head unload controller is configured to start controlling the head unloading with the head positioned on an inner circumference of the disk if the head unload controller operates during the manufacture inspection.

16. The disk drive of claim 14, wherein the head unload controller, the search module, the calculator, and the adjuster are configured to operate when usage of the disk drive meets a predetermined condition.

17. A disk drive comprising:
a head unload controller configured to control a head unloading in accordance with a head unload control command issued by a host computer;
a detector configured to detect a voice coil motor voltage or a voice coil motor current in the voice coil motor during the head unloading at a predetermined sampling period;
a transfer module configured to transfer a time series of the voice coil motor voltage or voice coil motor current detected by the detector to the host computer; and
an adjuster configured to adjust a rebound distance of the head smaller than a predetermined value in accordance with an adjustment command issued by the host computer, if the host computer which has received the time series (a) detects a first point of time when the head collides against a stopper of a ramp and a second point of time when the head rebounds as a result of the collision by searching for when a moving direction of the head changes based on the time series, and (b) calculates the rebound distance based on the first point of time and the second point of time, and if the rebound distance exceeds the predetermined value.

18. A method for calculating a head rebound distance for which a head rebounds after colliding against a stopper of a ramp during a head unloading in a disk drive, the method comprising:
searching for when a moving direction of the head changes in order to detect a first point of time when the head collides against the stopper of the ramp during the head unloading;
searching for when the moving direction of the head changes in order to detect a second point of time when the head rebounds as a result of the collision; and
calculating a rebound distance indicative of a distance that the head has rebounded based on the first point of time and the second point of time, the rebound distance being used for adjusting rebound of the head.

19. The method of claim 18, further comprising detecting a voice coil motor voltage or a voice coil motor current in a voice coil motor during the head unloading at a predetermined sampling period,
wherein the first point of time is when the voice coil motor voltage or the voice coil motor current becomes substantially equal to a leading value for the first time, except for a time to start the head unloading, in a time series of the voice coil motor voltage or the voice coil motor current detected at the predetermined sampling period.

20. The method of claim 19, wherein the second point of time is when the voice coil motor voltage or the voice coil motor current becomes substantially equal to the leading value for the first time after the first point of time in the time series.

* * * * *